(12) United States Patent
Mayman et al.

(10) Patent No.: US 10,080,089 B2
(45) Date of Patent: *Sep. 18, 2018

(54) SYSTEM WITH SPEAKER, TRANSCEIVER AND RELATED DEVICES

(71) Applicant: Bose Corporation, Framingham, MA (US)

(72) Inventors: Avrum G. Mayman, Canton, MA (US); Scott Talbot Yewell, Newburyport, MA (US); Lee Zamir, Cambridge, MA (US); Laszlo Otto Drimusz, Framingham, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,091

(22) Filed: Sep. 22, 2017

(65) Prior Publication Data
US 2018/0014134 A1   Jan. 11, 2018

Related U.S. Application Data

(63) Continuation of application No. 15/352,231, filed on Nov. 15, 2016, which is a continuation of application
(Continued)

(51) Int. Cl.
*H04R 27/00* (2006.01)
*G06F 13/42* (2006.01)
(Continued)

(52) U.S. Cl.
CPC ........... *H04R 27/00* (2013.01); *G06F 1/1632* (2013.01); *G06F 13/36* (2013.01);
(Continued)

(58) Field of Classification Search
CPC .............. H04R 27/00; H04R 2205/021; H04R 2227/003; H04R 2420/04; G06F 13/36;
(Continued)

(56) References Cited

U.S. PATENT DOCUMENTS 6,272,359 B1 * 8/2001 Kivela ..................... H04B 1/38
455/557
7,792,311 B1 * 9/2010 Holmgren ............... H04S 7/308
381/17
(Continued)

OTHER PUBLICATIONS

Wi-Fi Pearl to be Found in Oyster Speakers?, by Digital Trends Staff, Jan. 2, 2006, https://www.digitaltrends.com/home-theater/wi-fi-pearl-to-be-found-in-oyster-speakers/, 4 pages, retrieved Dec. 18, 2017.

(Continued)

*Primary Examiner* — Disler Paul

(57) ABSTRACT

An audio system includes a base station, an interface that enables transmission of audio content from a handheld media device to the base station via a cable, and one or more remote speakers configured to receive the audio content from the base station. The base station includes a housing, a speaker integrated within the housing to produce an audible signal from the audio content provided by the handheld media device, and a transceiver integrated within the housing for wirelessly transmitting the audio content to the one or more remote speakers. The one or more remote speakers are configured to wirelessly relay the audio content, thereby to supply the audio content beyond the transmission range of the transceiver.

21 Claims, 5 Drawing Sheets

Related U.S. Application Data

No. 15/010,126, filed on Jan. 29, 2016, now Pat. No. 9,606,952, which is a continuation of application No. 13/973,096, filed on Aug. 22, 2013, now Pat. No. 9,326,069, which is a continuation of application No. 11/513,957, filed on Aug. 31, 2006.

(51) Int. Cl.
| | |
|---|---|
| *G06F 13/40* | (2006.01) |
| *G06F 13/36* | (2006.01) |
| *G06F 1/16* | (2006.01) |
| *H04R 3/12* | (2006.01) |
| *H04R 5/02* | (2006.01) |
| *H04R 3/00* | (2006.01) |
| *H04L 27/00* | (2006.01) |

(52) U.S. Cl.
CPC .......... *G06F 13/4072* (2013.01); *G06F 13/42* (2013.01); *H04R 3/00* (2013.01); *H04R 3/12* (2013.01); *H04R 5/02* (2013.01); *H04L 27/00* (2013.01); *H04R 2205/021* (2013.01); *H04R 2227/003* (2013.01); *H04R 2420/07* (2013.01)

(58) Field of Classification Search
CPC ... G06F 13/4072; G06F 13/4081; G06F 13/42
USPC ..................................... 381/77, 79
See application file for complete search history.

(56) References Cited

U.S. PATENT DOCUMENTS

| | | | | |
|---|---|---|---|---|
| 8,326,951 | B1* | 12/2012 | Millington | H04L 41/0809 370/254 |
| 2002/0072816 | A1* | 6/2002 | Shdema | H04L 12/2805 700/94 |
| 2007/0149261 | A1* | 6/2007 | Huddart | H04R 5/033 455/575.2 |
| 2007/0173293 | A1* | 7/2007 | Tran | H04B 1/3822 455/569.1 |

OTHER PUBLICATIONS

Universal Plug and Play, Wikipedia, https://en.wikipedia.org/wiki/Universal_Plug_and_Play, 10 pages, retrieved Jan. 10, 2018.

Escient Fiireball SE-80 Digital Music Manager, by Michael Antonoff, Oct. 4, 2005, https://www.soundandvision.com/content/escient-fireball-se-80-digital-music-manager, 5 pages, retrieved Dec. 18, 2017.

Fireball DVD and Music Manager DVDM-100, Installation and User's Guide, Escient Manual No. M22003-01A3, Revision 1.2, Jul. 2004, 361 pages.

Escient Fireball E2 User's Manual, P/N: M22004-01A3, copyright 2004, 369 pages.

Escient Fireball AVX & MX Series User's Manual, P/N: M42001-02A1, copyright 2006, 136 pages.

Avega Uses Wireless, UPnP to Network Home Speakers, by Joseph Palenchar, Jan. 5, 2006, https://www.twice.com/product/avega-uses-wireless-upnp-network-home-speakers-2973, 3 pages, retrieved Dec. 18, 2017.

Avega: Wireless is More, CES 2006, by Wes Phillips, Jan. 4, 2006, https://www.stereophile.com/ces2006/010406avega/index.html, 4 pages, retrieved Dec. 18, 2017.

Avega's Oyster is a Pearl, by Mike Kobrin, Jan. 6, 2006, https://www.pcmag.com/article2/0,2817,1908704,00.asp, 2 pages, retrieved Dec. 18, 2017.

Escient Fiireball DVDM-100 Review, by Nathaniel Wilkins, Dec. 14, 2004, https://www.cnet.com/products/escient-fireball-dvdm-100/review/, 4 pages, retrieved Dec. 18, 2017.

Escient Fiireball DVDM-100 Review & Rating, by Bill Howard, Mar. 16, 2004, https://www.pcmag.com/article2/0,2817,1549587,00.asp, 5 pages, retrieved Dec. 18, 2017.

Escient Fiireball E2 Digital Music Server Review, by Nathaniel Wilkins, Jun. 14, 2006, https://www.cnet.com/products/escient-fireball-e2-400-400gb/review/, 4 pages, retrieved Dec. 18, 2017.

Escient Fiireball E-40 Digital Music Manager Review, by Nathaniel Wilkins, Oct. 12, 2003, https://www.cnet.com/products/escient-fireball-e-40-digital-music-manager/review/, 9 pages, retrieved Jan. 23, 2018.

* cited by examiner

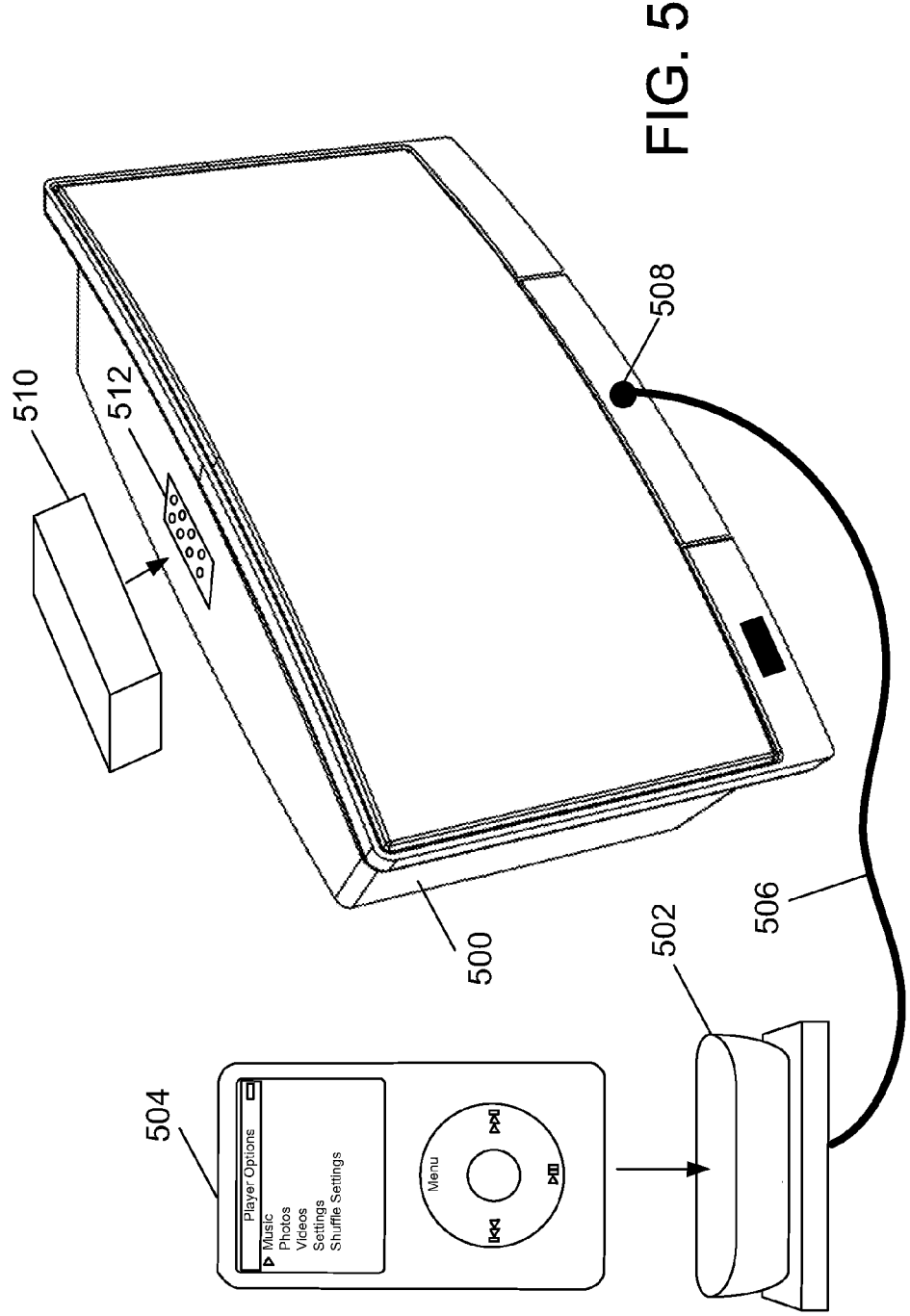

SYSTEM WITH SPEAKER, TRANSCEIVER AND RELATED DEVICES

CROSS-REFERENCE TO RELATED APPLICATIONS

This application is a continuation of U.S. application Ser. No. 15/352,231, filed, Nov. 15, 2016, which is a continuation of U.S. application Ser. No. 15/010,126, filed Jan. 29, 2016, now U.S. Pat. No. 9,606,952, which is a continuation of U.S. application Ser. No. 13/973,096, filed Aug. 22, 2013, now U.S. Pat. No. 9,326,069, which is a continuation of U.S. application Ser. No. 11/513,957, filed Aug. 31, 2006, now pending, the contents of which are incorporated herein by reference.

BACKGROUND

This disclosure relates to media playing from a speaker.

SUMMARY

In one aspect, an audio system includes a base station, an interface that enables transmission of audio content from a handheld media device to the base station via a cable, and one or more remote speakers configured to receive the audio content from the base station. The base station includes a housing, a speaker integrated within the housing to produce an audible signal from the audio content provided by the handheld media device, and a transceiver integrated within the housing for wirelessly transmitting the audio content to the one or more remote speakers. The one or more remote speakers are configured to wirelessly relay the audio content, thereby to supply the audio content beyond the transmission range of the transceiver.

Implementations may include one of the following features, or any combination thereof.

In some implementations, the interface includes a cradle capable of receiving the handheld media device. The cradle is coupled to the base station via the cable for transmitting signals containing the audio content between the cradle and the base station.

In certain implementations, the base station is configured to provide the audio content to the one or more remote speakers such that the audio content is played back substantially simultaneously by the base station and the one or more remote speakers.

In certain cases, the interface is mechanically coupled to the handheld media device via an electrical connector.

In some examples, a network is established among the transceiver and the one or more remote speakers, the network being one or more of a mesh network and a point-to-point network.

In certain examples, the one or more remote speakers include a plurality of remote speakers. The plurality of remote speakers are configured to relay the audio content amongst each other, thereby to supply the audio content beyond the transmission range of the first transceiver.

In some implementations, the audio system also includes a remote control that can transmit one or more signals to the one or more remote speakers to identify which remote speaker or group of remote speakers shall receive signals from the transceiver.

In certain implementations, the cable couples the handheld media device to the base station via a connector that utilizes an interface technique that is selected from the group consisting of: a universal serial bus port; a serial port, a parallel port, and an IEEE 1394 port.

In some cases, the cable includes a connector that connects directly to the handheld media device.

In certain cases, the interface includes a cradle that is capable of receiving the handheld media device, and the handheld media device includes a first connector that couples the handheld media device to the cradle. The cable couples the cradle to the base station via a second connector for transmitting wireless signals containing the audio content between the cradle and the base station.

In some cases, the transceiver complies with one or more protocols to transmit audio content including master/slave, server/client, and peer/peer.

In certain cases, the transceiver can produce two channels for wireless transmission that can carry separate sets of audio content.

In some examples, the transceiver is configured to wirelessly transmit control information, in addition to the audio content, to control operations of the remote speaker.

In certain examples, the transceiver is configured to wirelessly transmit digital information in addition to the audio content, and one or more of the one or more remote speakers comprises a display for presenting textual or graphical data included in the digital information transmitted from the transceiver.

In some implementations, the audio system also includes a remote control that can transmit a signal that initiates transmission of a signal from the transceiver that mutes at least one of the one or more remote speakers.

In certain implementations, the audio system further includes a remote control that can control the speaker in the housing and that can transmit a signal for selecting one or more of the one or more remote speakers for operation. The signal can be transmitted to the transceiver that identifies one or more of the one or more remote speakers that are to be provided audio content for producing audible signals.

Another aspect features a method that includes transmitting a first signal containing audio content from a handheld media device to a base station via a cable, and producing a first audible signal from the audio content via a speaker integrated within a housing of the base station. A second signal containing the audio content is wirelessly transmitted to a remote speaker via a transceiver that is integrated in the housing of the base station, and a second audible signal is produced from the audio content via the remote speaker. The method also includes wirelessly relaying the audio content from the remote speaker to an other remote speaker that is disposed beyond the transmission range of the transceiver of the base station, and producing a third audible signal from the audio content via the other remote speaker.

Implementations, may include one of the above and/or below features, or any combination thereof.

In some implementations, the steps of producing the first audible signal and producing the second audible signal include simultaneously producing the first and second audible signals from the audio content at the base station and the remote speaker, respectively.

In certain implementations, the steps of producing the first audible signal, producing the second audible signal, and producing the third audible signal include simultaneously producing the first, second, and third audible signals from the audio content at the base station, the remote speaker, and the other remote speaker, respectively.

Other features and advantages will be apparent from the description and the claims.

DESCRIPTION

FIG. 5 is a diagram of docking station with a detachable transceiver and media device cradle.

Figure 1:
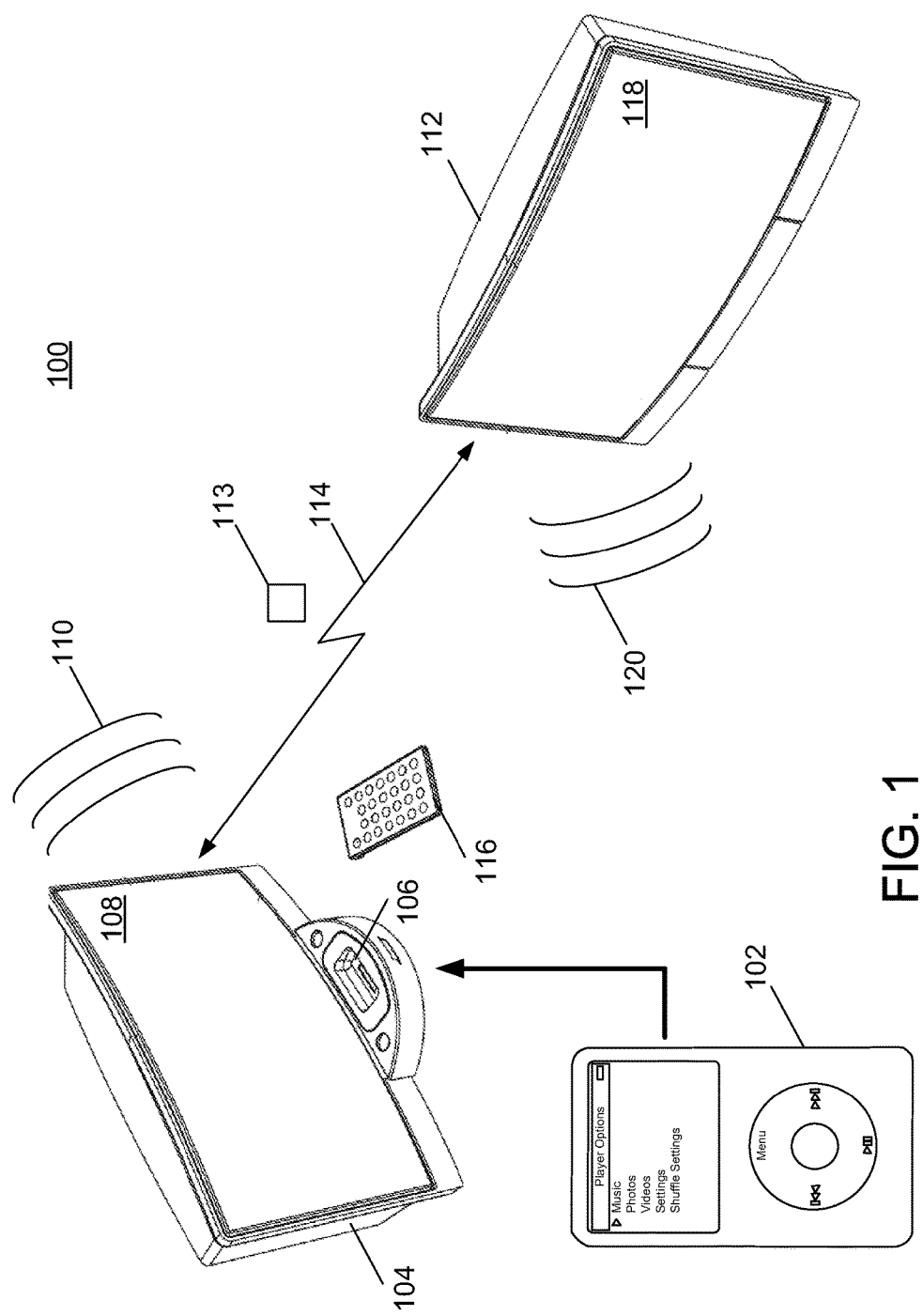
FIG. 1 is a diagram of media playing from a docked handheld media device.

Referring to FIG. 1, a system 100 plays media from a docked handheld media device 102 (e.g., an iPod® player) that contains a memory (not shown, e.g., a hard drive, flash memory, Read-Only Memory (ROM), Random-Access Memory (RAM), etc.) for storing digitized content such as audio or video. Some players have enough memory capacity to store thousands of digitized songs representing a person's entire music collection.

In addition to carrying his handheld media device 102 to enjoy his music collection privately through earphones (not shown) while on the move, a person may want to listen to songs from his collection at normal room listening levels while at a particular location, for example, while at home or in the office or while recharging the power source (e.g., rechargeable batteries) of the handheld media device 102. By inserting the handheld media device 102 into a docking port 106 of a docking station 104, the device can provide audio content to the docking station 104. The docking port 106 is be integrally formed with the housing of docking station 104 thereby providing a mechanical connection for receiving and supporting the handheld media device 102. The docking port 106 also provides an interface (e.g., a male connector) for providing a hard wire electrical connection for receiving audio content from and providing signals (e.g., commands) to the handheld media device 102. One or more powered speakers 108 included in the docking station 104 produce audible signals 110 at typical room levels from the audio content (e.g., songs) provide the desired listening experience.

In addition to listening to the songs from the speakers 108 in the docking station 104, a user may like to have the music played by one or more other speakers (such as a remote speaker 112) that are not part of the docking station, are not connected by wires to the docking station, or are otherwise "remote" from the docking station. The remote speaker 112 may be located in the house or office of the user, in the same room as the docking station or in a different room or outdoors or in a different nearby building. By providing music in real time (e.g., audio content is nearly simultaneously played at multiple locations without significant time delay) to the remote speakers, signal latency is reduced along with audible echo effects from the remotely located speakers. While audio content may be provided in real time, in some implementations, latency may be permissible. For example, if two or more speakers (e.g., speaker 108 in the docking station 104, remote speaker 112, etc.) are located such their respectively produced audio could not be heard simultaneously, an amount of latency may be allowed. Additionally, in some implementations, the audible signal reproduced by the docking station 104 may correspond to different content than the content used to produce the audible signal by the remote speaker 112. For example, a user may listen to one song at the docking station while another song is transmitted by the docking station to the remote speaker for playback.

Each remote speaker 112 may receive signals representing audio content from the docking station 104 through a wireless link 114 that uses radio frequency (RF), infrared (IR), laser or other wireless technology.

Before sending the audio content signal through the wireless link 114, the docking station 104 may process the audio content, for example, by encoding or encrypting or both for efficient and secure transmission. In addition to the audio content, other data may be transmitted from the docking station 104 to the remote speaker. For example, data 113 (e.g., an Internet Protocol (IP) address, a Media Access Control (MAC) address, etc.) that uniquely identifies the remote speaker 112 may be incorporated into the wireless transmission over the link 114. By detecting this identification data, each remote speaker 112 may determine whether it is the speaker for which the audio content is intended and, if so, may decode and prepare the audio content for playback at the pre-identified remote speaker.

Along with unique identification information, other types of information may be transmitted to one or more remote speakers. For example, metadata (i.e., data that describes other data) that may describe media content (e.g., audio content, video content, etc.), control information (e.g., transport control), user interface (UI) information for providing system control to a remote user interface (e.g., at a remote speaker, a hand held remote, etc.), communication channel information (e.g., data transmission error rate, spread spectrum information such as frequency hop parameters, signals for channel equalization, etc.). Data 113 may also be provided in a bi-directional manner such that the docking station 104, the remote speaker 112 or other devices included in the sound system 100 may transmit or receive the data.

The sound system 100 may include a remote control 116 to control the operations of one or more system components. For example, the remote control 116 may be used to control the operations of the handheld media device 102 once inserted in the docking port 106. In some implementations, the remote control 116 may directly send commands to the handheld media device 102, while in other implementations, the remote control 116 may send commands to the docking station 104 that are passed to the handheld media device 102.

The remote control 116 can control, for example, navigation of a menu structure (e.g., selecting menu entries) that catalogs stored content, turning the device on and off, setting the backlight level, selection of playback operations (e.g., stop, play, pause, mute, skip forward, and skip back), changes to the volume level, creation, storage, editing and execution of song sequences (e.g., playlists), and other functions typically provided by the user interface of handheld media device 102.

In some implementations, the remote control 116 may control operations of docking station 104, for example, volume control of the one or more speakers 108, characteristics of the wireless link 114 (e.g., transmission frequency and amplitude), identify which remote speaker(s) may access the wireless link (e.g., select a unique identification number assigned to a speaker) and encoding and encryption parameters. Typically, one or more analog or digital signals are transmitted over the wireless link 114 to provide audio content (and other data) to the remote speaker 112.

In some implementations, a digital signal may be transmitted over the wireless link 114. The digital signal may represent one or more files that are stored in the handheld media device 102 or are derived from another source. This digital signal may adhere to one or more protocols. For example, audio content associated with an individual song may be compressed into a file using one or more coding schemes such as the Moving Pictures Experts Group (MPEG) audio layer 3 (MP3). These MP3 files may be stored in the handheld media device 102 and may be retrieved to access and play back the audio content. Similar to the audio content, the MP3 files may also be sent over the wireless link 114 for delivery and play back by one or more speakers 118 included in remote speaker 112.

The remote control 116 may also be used to control operations of one or more remote speakers such as the remote speaker 112, such as adjusting playback parameters (e.g., volume control, balance, and equalization), powering the speaker on and off, and setting a unique speaker identifier (e.g., an alphanumeric identifier) for the remote speaker 112.

The remote control 116 may implement one or more wireless techniques to establish communications with one or more components (e.g., the handheld media device 102, the docking station 104, or the remote speaker 112), for example, infrared, RF, and laser techniques, individually or in combination. The remote speaker 112 may receive wireless signals from the remote control 116 that initiate such events as adjusting the volume of the one or more speakers 118, mute the speaker playback, and turn the power on and off. The docking station 104 may also receive signals for initiating these or similar events. Additionally, the remote control 116 may provide signals to trigger system wide operations. For example, the remote control 116 may transmit a signal to the docking station 104 that initiates transmission of a signal (e.g., over the wireless link 114) to mute the remote speaker 112. Alternatively, a signal may be sent over the wireless link 114 to cause the one or more speakers 118 to produce audible signals 120.

The remote control 116 may also transmit a signal for selecting one or more remote speakers for operation. For example, a signal may be transmitted to the docking station 104 that identifies one or more remote speakers that are to be provided audio content for producing audible signals. In some implementations, each remote speaker may include a selector switch (e.g., a hardware implemented switch or a software implemented switch or both). By placing the switch in a particular state (e.g., state 1, state 2, etc.), the remote speaker may be grouped with other remote speakers having switches in the same state. For example, the selector switches of remote speakers located in a master bedroom may be placed in "state 1" while the selector switches of remote speakers located in a kitchen may be placed in "state 2". The selector switch states may be considered room codes and may be used for identifying remote speakers located in each room. Dependent upon the switch states, a signal from remote control 116 may control signal transmission from docking station 104 to a particular group of remote speakers. For example, by identifying "state 1" in a signal from remote control 116, the docking station 104 may provide signals to the remote speakers located in the master bedroom for producing audible signals (e.g., music). Along with providing a signal to the docking station 104, the remote control 116 may transmit one or more signals to the remote speakers to identify which speaker or group of speakers shall receive signals from the docking station 104.

Figure 2:
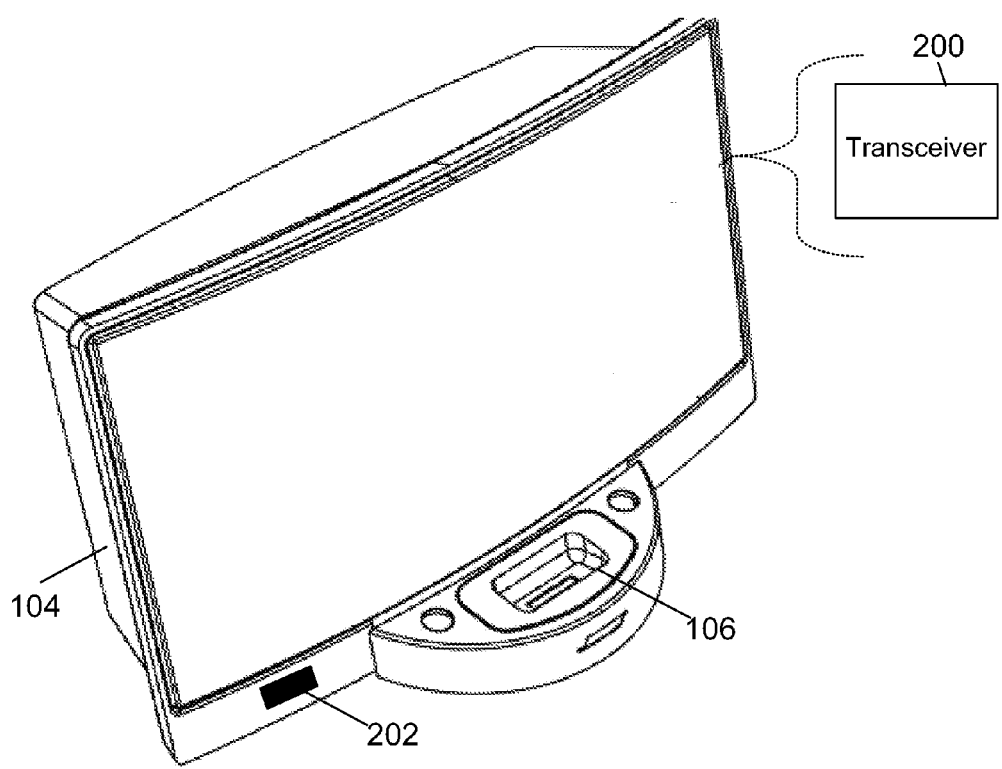
FIG. 2 is a perspective view of a docking station.

Referring to FIG. 2, a transceiver 200 is included in the docking station 104 to transmit signals that contain content (e.g., audio content) over one or more wireless links such as the wireless link 114. The transceiver 200 may implement IR, RF, laser or other technology, in combination or individually. In some implementations, the transceiver 200 may include an RF transmitter for transmitting wireless signals, e.g., on a 2.4 GHz carrier frequency, using a spread spectrum technique (e.g., frequency hopping, etc.) such that a carrier frequency varies over a range of frequencies, etc. Additionally, for receiving wireless signals, the transceiver 200 may include a receiver for receiving wireless signals on the carrier frequency (e.g., 2.4 GHz), or inserted in a spread spectrum signal. Other wireless communication protocols may also be used by the transceiver 200. For example, Bluetooth technology may be incorporated such that the transceiver 200 may interconnect over relatively small ranges. Ultra Wide Band (UWB) technology may be implemented such that relatively large amounts of digital data may be transmitted over a wide spectrum of frequency bands with relatively low power for short distances. The transceiver 200 may also comply with one or more communication standards such as Institute of Electrical and Electronics Engineers (IEEE) 802.11 standards. The transceiver 200 may also use one or more specifications described in U.S. Published Patent Application US-2005-0272436, published on Dec. 8, 2005, and U.S. patent application Ser. No. 10/640,215, filed on Aug. 12, 2003, both of which are incorporated by reference here.

The transceiver 200 may perform signal processing prior to transmission using, e.g., amplitude modulation, frequency modulation, or phase modulation and/or digital modulation schemes (e.g., frequency shift key (FSK), phase shift key (PSK), quadrature amplitude modulation (QAM)), or other similar modulation techniques to prepare the content (e.g., audio content) for transmission.

In some arrangements, the transceiver 200 may comply with one or more protocols to transmit audio content. For example, some protocols may include a master/slave communication protocol, a server/client protocol, or a peer/peer communication protocol. Generally, in using a master/slave protocol, one device is a master and the other or others are slaves. The master typically controls the slaves. Using a client/server communication protocol, a server responds to requests from the client or clients. Using a peer to peer communication protocol, either of the two devices may initiate a communication session. The transceiver 200 may use one or more encoding schemes (e.g., error correction encoding or data compression) and/or encryption schemes (e.g., symmetric encryption, asymmetric encryption, or hashing functions) to prepare the audio content for transmission.

The transceiver 200 may produce one or more channels for wireless transmission. For example, two channels may be produced that are capable of carrying separate sets of audio content. One channel may be assigned to carry audio content provided by the handheld media device 102, while a second channel may carry audio content provided from an another audio source connected (e.g., by an auxiliary jack) to the docking station 104. Other audio sources may include home entertainment equipment (e.g., stereo equipment, compact disc (CD) player, or digital video disc (DVD) player), another handheld media device (e.g., iPod), satellite signals (e.g., satellite radio), a cable system (e.g., audio signals from a cable television system), computer systems (e.g., the Internet) or other type of audio content provider.

To receive signals from a wireless remote control (e.g., the remote control 116), additional circuitry may be included in the transceiver 200 and the docking station 104. For example, a surface mounted signal collector 202 (e.g., an RF antenna, IR detector, or photo detector) may be incorporated into the docking station 104. Additionally, decoding circuitry (e.g., an IR decoder) may be included in the docking station to decode or identify the one or more commands provided by the remote control 116. Once identified, commands associated with the docking station 104 or the handheld media device 102 may be executed locally while commands associated with other system components (e.g., the remote speaker 112) may be transmitted for remote execution.

Power to the docking station 104 may be provided by an integrated power supply that converts alternating current (AC) power into a direct current (DC) or by batteries (e.g., rechargeable batteries) or battery packs. Power supply circuitry along with circuitry for other operations (e.g., detection, modulation, or encoding) may be implemented in analog and/or digital circuitry. Analog circuitry may include passive and active components while digital circuitry may include one or more general processors (e.g., a microprocessor) and one or more specialized devices (e.g., an application specific integrated circuit (ASIC)). One or more of the processors and/or components may be implemented in a single integrated circuit as a monolithic structure or in a distributed structure.

Power supply techniques may also be incorporated into the docking station 104 for other applications. For example, while inserted in the docking port 106, a power source (e.g., one or more rechargeable batteries) included in the handheld media device 102 may be recharged by power supply circuitry included in the docking station 104. Recharging may be executed at substantially the same time the media device 102 is being accessed or is providing content to docking station 104.

To transmit and receive signals, the docking station 104 may include one or more internally or externally mounted antennas (not shown), for example, one or more conformal antennas (e.g., a patch antenna or a stripline antenna) and one or more protruding antennas (e.g., a telescope antenna).

Figure 3:
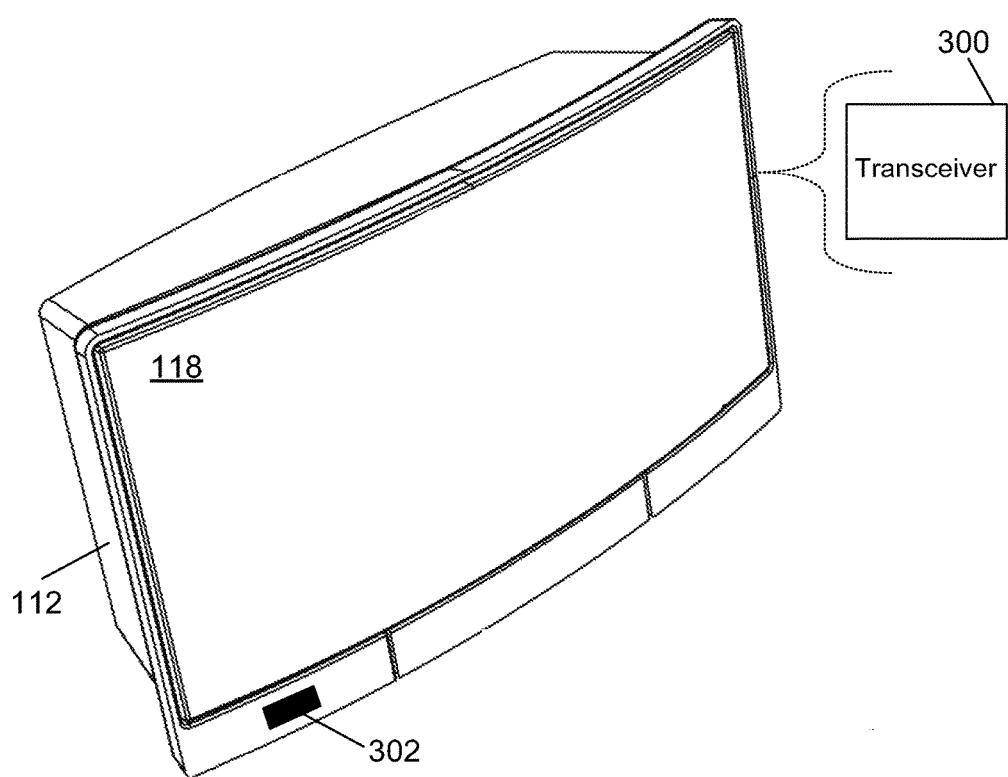
FIG. 3 is a perspective view of a speaker.

Referring to FIG. 3, the remote speaker 112 may include a transceiver 300 that is capable of operating in a reception or transmission mode to establish one or more wireless links. In some situations, the transceiver 300 may establish a link with another transceiver (e.g., the transceiver 200 shown in FIG. 2). As for the transceiver 200, the transceiver 300 may implement one or more wireless technologies (e.g., RF technology, IR technology, or laser technology) for receiving or transmitting wireless signals. Dependent upon processing executed at a transmission site, the transceiver 300 may execute operations (e.g., demodulation, decoding, or decryption) to access audio content included in a received wireless signal. The audio content may be further processed (e.g., filtered or amplified) by circuitry (e.g., analog circuitry or digital circuitry) prior to being provided to the one or more speakers 118 included in the remote speaker 112.

Transceiver 300 may also operate in a transmit mode so that the remote speaker 112 may send wireless signals to one or more locations. For example, a signal that confirms that audio content has been properly received by the remote speaker 112 may be transmitted to the docking station 104. Alternatively, an alert signal indicating that audio content has not been properly received may be sent by the transceiver 300. Other types of procedures (e.g., handshaking) may also be executed by transmitting signals from the transceiver 300. Wireless signals sent from the remote speaker 112 may effect the operations of the docking station 104. For example, transmitted signals may trigger the handheld media device 102 to select another song (e.g., skip forward to next track or skip back to previous track), change selectable songs (e.g., change song play list) or perform another operation.

A wireless signal may also be transmitted to trigger an operation associated with the docking station 104. For example, a wireless signal may be sent to switch the audio content source from the handheld media device 102 to equipment connected to an auxiliary jack (e.g., a CD player, cable television, or satellite radio receiver) included in the docking station 104. Some wireless signals transmitted by the transceiver 300 may also include content (e.g., audio content). For example, audio content received by the transceiver 300 may be relayed to another location (e.g., another remote speaker or group of remote speakers). By receiving and transmitting wireless signals, the transceiver 300 may be used to establish a wireless network among other remote speakers and one or more docking stations.

As for the docking station 104, the remote speaker 112 may incorporate various types of power supplies. One or more batteries may provide power and may allow the remote speaker 110 to be portable (e.g., moved into another office or to an outside deck). An AC power supply may also be incorporated (with or without the batteries) that may convert an AC voltage signal into a DC voltage level. As for the docking station 104, the remote speaker 112 may also implement one or more antennas (e.g., conformal, extendible, internally mounted, etc.) for receiving and/or transmitting wireless signals.

To communicate with the remote control 116, the remote speaker 112 may include a surface mounted signal collector 302 (e.g., an RF antenna, IR detector, photo detector, etc.). The remote speaker 112 may also include circuitry (e.g., analog or digital) for processing the wireless remote control signals (e.g., RF signals, IR signals, or laser signals) received from the signal collector 302. As for the docking station 104, the remote speaker 112 may include circuitry for determining if the remote control signals include commands for local execution (e.g., by the remote speaker 112) or remote execution (e.g., by the docking station 104 or another remote speaker) For remote execution, the transceiver 300 may wirelessly send one or more signals to an appropriate location to initiate execution of one or more operations.

Figure 4:
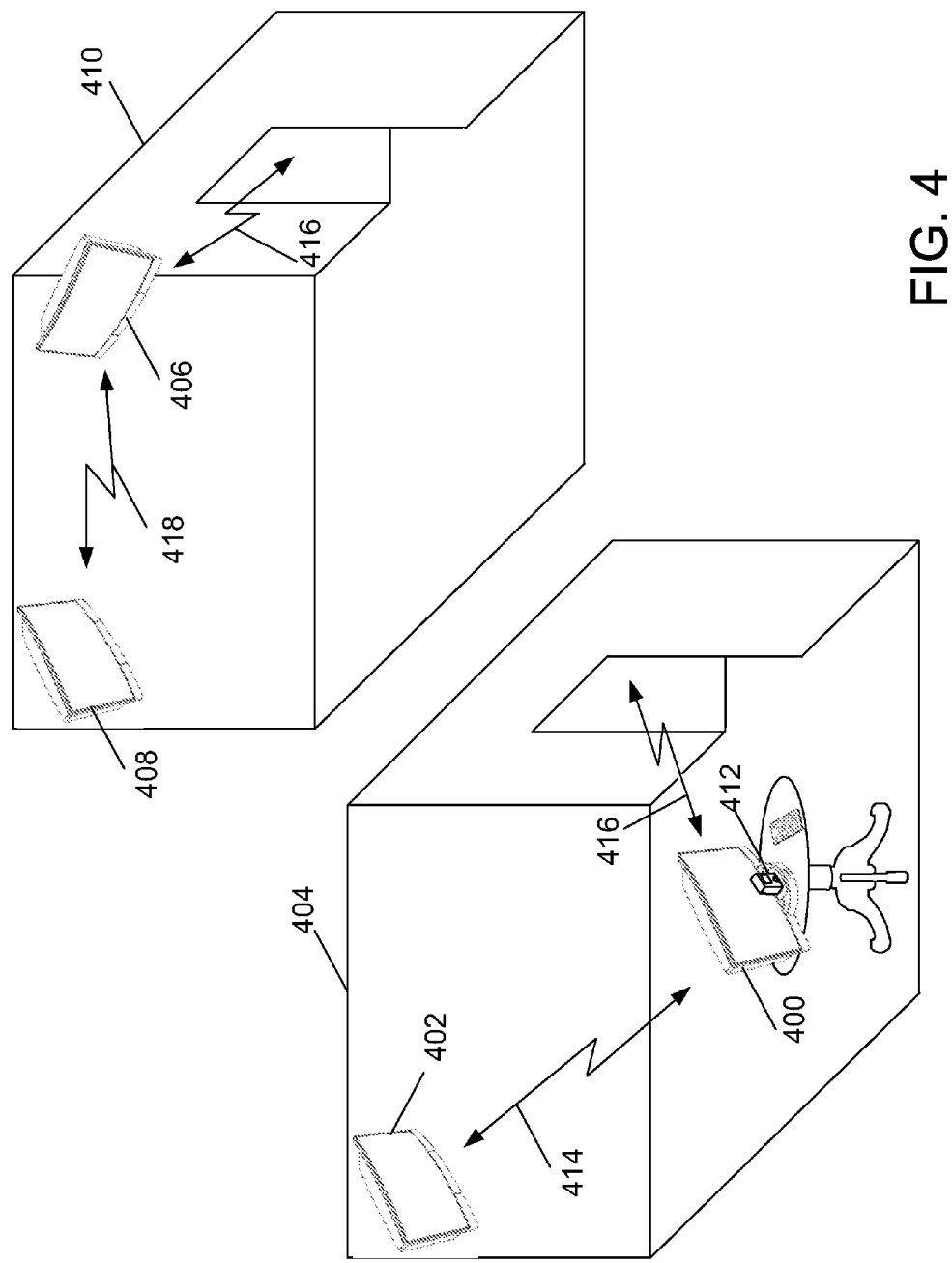
FIG. 4 is a diagram of media playing from a docked handheld media device.

Referring to FIG. 4, for example, one docking station and multiple remote speakers may be distributed between two rooms. In this example, a docking station 400 and a remote speaker 402 are placed in one room 404, while two other remote speakers 406 and 408 are wall mounted in a second room 410. To provide audio content, a handheld media device 412 may be inserted into docking station 400. Each of the remote speakers 402, 406, 408 and the docking station 400 includes a transceiver for transmitting and receiving wireless signals. In this example, to provide audio content to the remote speaker 402, a wireless link 414 is established between docking station 400 and the remote speaker. Wireless links are also established with remote speakers 406 and 408 in room 410. In particular, a wireless link 416 is established between the docking station 400 and the remote speaker 406.

The docking station 400 provides the audio content to the remote speakers in real time and reduces distracting echo effects from the speakers located in different rooms (e.g., low latency transmissions of approximately 40 milli-seconds).

To supply the audio content beyond the transmission coverage provided by the docking station 400, one or more of the remote speakers may wirelessly relay audio content to one or more other remote speaker or devices. For illustrative purposes, the remote speaker 408 may be beyond the transmission range of the docking station 400. To provide audio content to the remote speaker 408, the remote speaker 406 may relay the audio content provided by the wireless link 416 to the remote speaker 408 through a wireless link 418. As for other wireless links, the wireless link 418 may bi-directionally pass signals. Thus, signals (e.g., containing commands from a remote control) may be passed from the remote speaker 408 to the remote speaker 406, e.g., for delivery to docking station 400. By relaying content (e.g., audio content or remote control commands), a wireless network may be established among the remote speakers and the docking station. For example, if each network node (e.g., a remote speaker or docking station) establishes a wireless link with two or more other network nodes, a mesh network may be established such that content may "hop" from node to node until it reaches one or more destination nodes.

Various types of network architectures may be implemented for passing content among network nodes. For example, point-to-point network connections may allow content to be passed from one node to another, point-to-multipoint connections may allow broadcasting of content from one to many nodes, or other similar network architectures may be implemented.

In some arrangements, each remote speaker may be capable of selecting particular content that is included in wireless transmissions from the docking station. For example, if two channels of audio content are wirelessly being provided to the remote speaker 402, data stored in the remote speaker may be used to selectively receive content from one of the channels. Furthermore, data stored at the remote speaker may be provided by a user using a remote control. So, if the docking station 400 transmits two channels of audio content, the remote speaker 402 may select (from stored data) one channel while the remote speakers 406 and 408 may select (from data stored at each respective remote speaker) the other channel.

In some arrangements, the docking station 400 may direct audio content to one or more particular remote speakers. For example, the docking station 400 may direct one channel of audio content to remote speaker 402 and another channel of content to the remote speakers in room 410 (e.g., the remote speakers 406 and 408). One or more techniques may be implemented for directing a channel (or channels) to one or more destinations. For example, the docking station and the remote speakers may comply with a protocol such that each remote speaker is addressable. By assigning a unique address to each remote speaker, the docking station 400 may direct content to one or more of the remote speakers using the particular addresses. For example, each remote speaker may be selected to be uniquely responsive to a particular transmission frequency. Thus, by transmitting audio content at one or more of these select frequencies, the uniquely corresponding remote speakers may receive the audio content. Similar to the docking station, one or more remote speakers may also selectively direct (e.g., relay) content to one or more destinations (e.g., another remote speaker).

As mentioned above, various types of sources may provide audio content that may be transmitted from docking station 400 to one or more of the remote speakers. For example, besides content stored in the handheld media device 412, audio content from a satellite based system (e.g., satellite radio, etc.), a cable based system (e.g., cable television system, etc.), a computer based system (e.g., the Internet) or other similar audio content source may be provided for transmission from the docking station 400. Along with audio content, other types of content may be transmitted among the docking station and the one or more remote speakers. For example, video content provided from the handheld media device 412 or another type of video content source (e.g., satellite system, cable television system, the Internet, etc.) may be transmitted among the docking station 400 and the remote speakers 402, 406 and 408. Digital information (e.g., textual data or graphical data) may also be transmitted among the devices individually or in combination with audio content and video content. For example, text (e.g., artist name and information) and graphics (e.g., album cover) may be transmitted from the docking station 400 to one or more of the remote speakers 402, 406 and 408. This textual and graphical data may be presented on a video display incorporated into one or more of the remote speakers and/or displays in communication with one of more of the remote speakers.

In some arrangements, multiple docking stations may be included in a system such as the sound system 100. Each docking station may be assigned one or more dedicated remote speakers or the multiple docking stations may share one or more remote speakers. Different transmission signal characteristics (e.g., frequency, phase, polarization, etc.), modulation schemes, etc., may be implemented for the remote speakers to distinguish signals from the multiple docking stations. The remote speakers may be addressable so that signals from the multiple docking stations may be selectively received. For example, remote speakers located in one part of a house (e.g., a formal living room) may be configured to receive signals from one docking station while in another part (e.g., a family room), remote speakers may be configured to receive signals.

Referring to FIG. 5, in some implementations portions of a docking station may be located external to the docking station housing. In this exemplary design, a docking station 500 includes a cradle 502 that is capable of receiving a handheld media device 504. Typically, the handheld media device 504 includes a connector (e.g., a bus interface) that couples the media device to the cradle 502. The cradle 502 may be coupled to the docking station 500 to exchange signals (e.g., signals containing audio content, video content, digital data, etc.). In this implementation, a cable 506 couples the cradle 502 to docking station 500 (via a connector 508). The connector 508 may use one or more interface techniques such as being a universal serial bus (i.e., USB) port, a serial port, a parallel port, an IEEE 1394 (i.e., FireWire) port, or provide another similar type of connection.

While cable 506 implements a hardwire connection between the cradle 502 and docking station 500, wireless techniques may also be used to connect the devices. For example, IR, RF, laser, or other wireless methodologies may be implemented for transmitting wireless signals between the cradle 502 and the docking station 500.

In this implementation, the cradle 502 is capable of receiving the handheld media device 504 and holding the device in a substantially upright position. However, in some implementations, other types of trays that detach from the docking station 500 may be used. Furthermore, rather than implementing a detachable tray, a connector (not shown) may connect the cable 506 directly to the handheld media device 504.

A detachable transceiver 510 provides wireless transmission and reception functionality for docking station 500. A hardwire connector 512 allows signals to be passed between the detachable transceiver 510 and the docking station 500. However, similar to the cradle 502, wireless technology (e.g., IR, RF, laser, etc.) may be incorporated into the detachable transceiver 510 and the docking station 500 for passing wireless signals. Also, one or more antennas may be located in the detachable transceiver 510 or in the docking station 500 for emitting and receiving the wireless signals.

When in an attached position, detachable transceiver 510 appears to extend a noticeable distance from the housing of docking station 500. However, in other implementations, a detachable transceiver may be shaped such that it conforms to the housing of the docking station 500.

Other embodiments are within the scope of the following claims. For example, various types of speakers may be incorporated into the docking station 400 or the remote speaker 402. Furthermore, while the implementations mentioned above describe transmission of audio signals between a docking station and remote speaker units (e.g., other dockings stations, powered speaker enclosures, etc.), some implementations may include transmitting a signal that contains video content that is stored on a hand-held media device from a docking station (e.g., a docking station with an integrated video display and/or speaker) to remote devices having an integrated video display and/or speaker.

What is claimed is:

1. An audio system comprising:
   a base station;
   an interface that enables transmission of audio content from a handheld media device to the base station via a cable; and
   one or more remote speakers configured to receive the audio content from the base station,
   wherein the base station comprises:
   a housing;
   a speaker integrated within the housing to produce an audible signal from the audio content provided by the handheld media device; and
   a transceiver integrated within the housing for wirelessly transmitting the audio content to the one or more remote speakers, and
   wherein the one or more remote speakers are configured to wirelessly relay the audio content, thereby to supply the audio content beyond the transmission range of the transceiver.

2. The audio system of claim 1, wherein the interface comprises a cradle capable of receiving the handheld media device, wherein the cradle is coupled to the base station via the cable for transmitting signals containing the audio content between the cradle and the base station.

3. The audio system of claim 1, wherein the base station is configured to provide the audio content to the one or more remote speakers such that the audio content is played back substantially simultaneously by the base station and the one or more remote speakers.

4. The audio system of claim 1, wherein the cable is mechanically coupled to the handheld media device via an electrical connector.

5. The audio system of claim 1, wherein a network is established among the transceiver and the one or more remote speakers, the network being one or more of a mesh network and a point-to-point network.

6. The audio system of claim 1, wherein the one or more remote speakers comprise a plurality of remote speakers, the plurality of remote speakers being configured to relay the audio content amongst each other, thereby to supply the audio content beyond the transmission range of the first transceiver.

7. The audio system of claim 1, further including a remote control that can transmit one or more signals to the one or more remote speakers to identify which remote speaker or group of remote speakers shall receive signals from the transceiver.

8. The audio system of claim 1, wherein the cable couples the handheld media device to the base station via a connector that utilizes an interface technique selected from the group consisting of: a universal serial bus port; a serial port, a parallel port, and an IEEE 1394 port.

9. The audio system of claim 1, wherein the cable includes a connector that connects directly to the handheld media device.

10. The audio system of claim 1, wherein the interface comprises a cradle capable of receiving the handheld media device, wherein the handheld media device includes a first connector that couples the handheld media device to the cradle, and wherein the cable couples the cradle to the base station via a second connector for transmitting signals containing the audio content between the cradle and the base station.

11. The audio system of claim 10, wherein the second connector utilizes an interface technique selected from the group consisting of: a universal serial bus port; a serial port, a parallel port, an IEEE 1394 port.

12. The audio system of claim 1, wherein the transceiver complies with one or more protocols to transmit audio content including master/slave, server/client, and peer/peer.

13. The audio system of claim 1, wherein the transceiver can produce two channels for wireless transmission that can carry separate sets of audio content.

14. The audio system of claim 1, wherein the transceiver is configured to wirelessly transmit control information, in addition to the audio content, to control operations of the remote speaker.

15. The audio system of claim 1, the transceiver is configured to wirelessly transmit digital information in addition to the audio content, and wherein one or more of the one or more remote speakers comprises a display for presenting textual or graphical data included in the digital information transmitted from the transceiver.

16. The audio system of claim 1, further including a remote control that can transmit a signal that initiates transmission of a signal from the transceiver that mutes at least one of the one or more remote speakers.

17. The audio system of claim 1, further including a remote control that can control the speaker in the housing and that can transmit a signal for selecting one or more of the one or more remote speakers for operation.

18. The audio system of claim 17, wherein the signal can be transmitted to the transceiver that identifies one or more of the one or more remote speakers that are to be provided audio content for producing audible signals.

19. A method comprising:
   transmitting a first signal containing audio content from a handheld media device to a base station via a cable;
   producing a first audible signal from the audio content via a speaker integrated within a housing of the base station;
   wirelessly transmitting a second signal containing the audio content to a remote speaker via a transceiver that is integrated in the housing of the base station;
   producing a second audible signal from the audio content via the remote speaker;
   wirelessly relaying the audio content from the remote speaker to an other remote speaker that is disposed beyond the transmission range of the transceiver of the base station; and producing a third audible signal from the audio content via the other remote speaker.

20. The method of claim 19, wherein the steps of producing the first audible signal and producing the second audible signal comprise simultaneously producing the first and second audible signals from the audio content at the base station and the remote speaker, respectively.

21. The method of claim 20, wherein the steps of producing the first audible signal, producing the second audible signal, and producing the third audible signal comprise simultaneously producing the first, second, and third audible signals from the audio content at the base station, the remote speaker, and the other remote speaker, respectively.

* * * * *